No. 686,424. Patented Nov. 12, 1901.
W. J. SMITH.
SCREW DRIVER KIT.
(Application filed May 6, 1901.)
(No Model.)
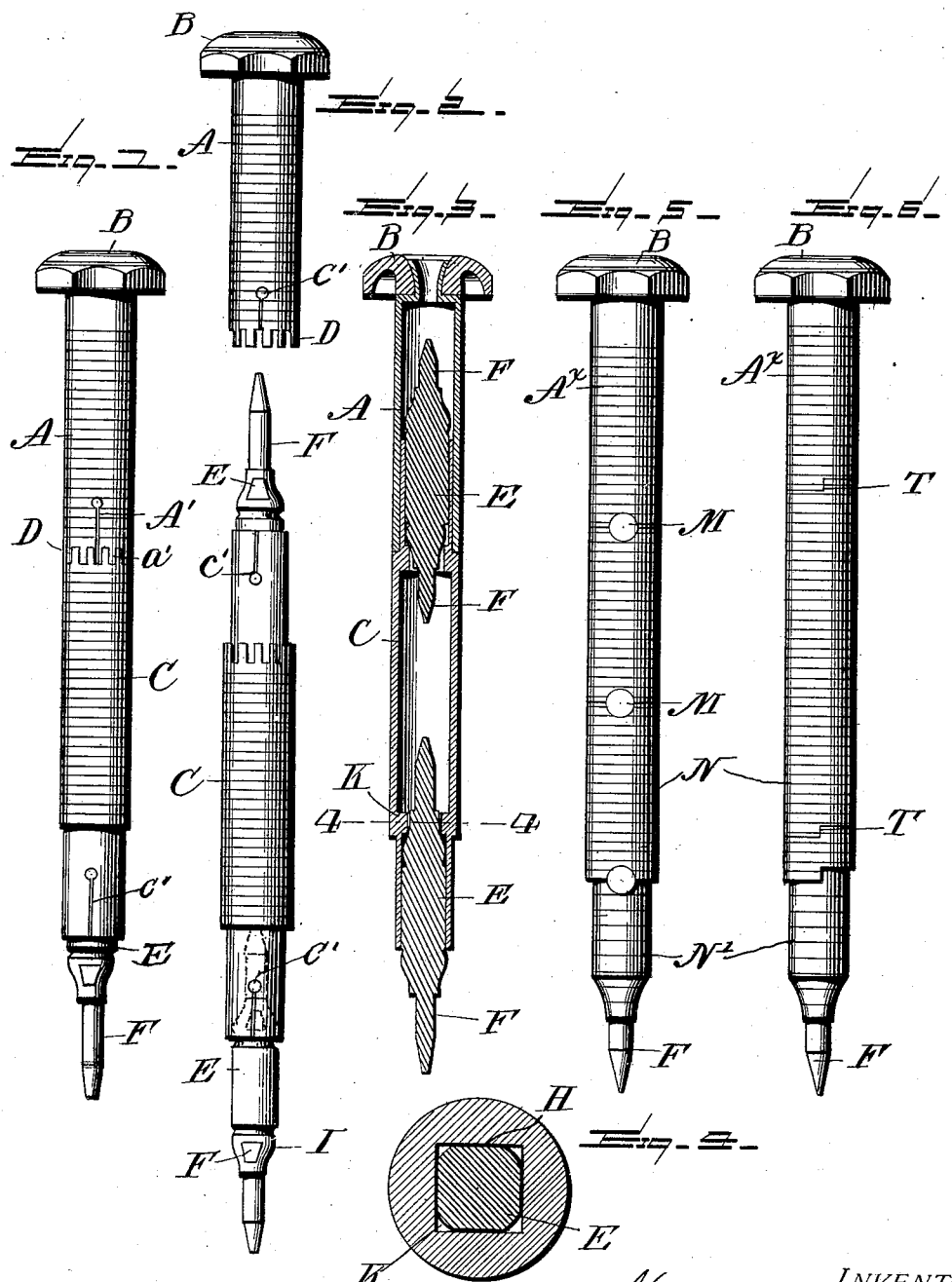
WITNESSES:
INVENTOR
William J. Smith,
BY Franklin H. Hough
Attorney

UNITED STATES PATENT OFFICE.

WILLIAM J. SMITH, OF LOWVILLE, NEW YORK, ASSIGNOR TO WILLIAM H. EGLETON AND JESSIE N. SMITH, OF LOWVILLE, NEW YORK.

SCREW-DRIVER KIT.

SPECIFICATION forming part of Letters Patent No. 686,424, dated November 12, 1901.

Application filed May 6, 1901. Serial No. 58,987. (No model.)

*To all whom it may concern:*

Be it known that I, WILLIAM J. SMITH, a citizen of the United States, residing at Lowville, in the county of Lewis and State of New York, have invented certain new and useful Improvements in Screw-Driver Kits; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in screw-drivers, drills, &c., and especially to a novel kit containing a number of screw-drivers or drills, which are held together in telescoping casing-sections, one of the sections having a swivel-head and means being provided whereby the sections are prevented from rotating independent of each other, mechanism also being provided for preventing the chuck from turning within the casing.

The invention will be hereinafter more fully described and then specifically defined in the appended claims, and is clearly illustrated in the accompanying drawings, which, with the letters of reference marked thereon, form a part of this application, and in which—

Figure 1 is a side elevation of the tool. Fig. 2 is a detail view of the parts disassembled. Fig. 3 is a central longitudinal sectional view through the tool with the parts adjusted together. Fig. 4 is a cross-sectional view taken on line 4 4 of Fig. 3. Figs. 5 and 6 are views of slight modifications.

Reference now being had to the details of the drawings by letter, A designates a section of the casing having a swiveled cap B, which section is chambered out, slitted, as at A', in its free end, and having a suitably-milled circumference.

C designates one of the barrel portions of the casing, which has its ends slitted, as at C', each end being contracted sufficiently to telescope within the section A should it be desired to connect one end or the other of said barrel portion to the section having the swivel-cap. The circumference of the portion C is also milled, and the shoulder formed by contracting the ends, as described, is provided with a series of teeth D, which are adapted to intermesh with a similar series of teeth $a$, which are formed in the free end of the section A. When the two sections A and C are adjusted one within the other, the intermeshing teeth will prevent same from turning independent of each other. Telescoping within each end of said barrel portion C is a chuck or screw-driver holder E, in which the screw-driver F, drill, or other tool is either adjustably held or fixed thereto. Each end of said chuck has four flattened portions H, which are in pairs and diametrically opposite each other and are provided to engage the edges of the square outlined aperture K within said barrel-section at a location nearly opposite the shoulder on the circumference of barrel C, whereby when the chuck is seated within the end of the barrel the chuck is prevented from turning independent of the barrel. This square outlined aperture serves also to limit the inward throw of the chuck by said flattened portions coming into contact with the marginal edges of the aperture. Each end of the barrel is similarly constructed, so as to receive and hold either one of the chucks, which are reversible.

From the foregoing it will be observed that a plurality of screw-drivers, drills, or other tools may be assembled in a compact and convenient form, and securely held together, the barrel portion to the section A by means of the flexible free end of said casing A telescoping over the contracted end of the barrel, and the chucks are prevented from turning by the flattened portions thereon coming in contact with the marginal edges of said square outlined aperture, while the section A is prevented from turning independent of the barrel by the intermeshing teeth on the end of said section and shoulder of the barrel.

In Figs. 5 and 6 I have shown slight modifications in the means for holding the sections of the casing from rotation, in Fig. 5 a lug M being shown as secured to the barrel portion N and engaging in a concaved recess in the edge of the casing $A^\times$, said casing $A^\times$ telescoping over a reduced portion of the barrel N. In Fig. 6 instead of the lug and concaved recess being employed to hold the parts from rotation I provide angled shoulders T on the adjacent edges.

Having thus described my invention, what I claim to be new, and desire to secure by Letters Patent, is—

1. A screw-driver kit comprising a barrel portion, reversible chucks designed to telescope therein, a casing-section telescoping over the end of said barrel portion, a swivel-head mounted on said casing-section, and means for preventing the barrel portion and the casing-section from turning independent of each other, as set forth.

2. A screw-driver kit comprising a barrel portion, a casing-section telescoping over same, a swivel-head on said casing-section, reversible chucks telescoping within the ends of said barrel portion, and means for preventing said chucks, barrel portion and casing-section from turning independent of one another, as set forth.

3. A screw-driver kit consisting of a barrel portion having slitted ends, a casing-section telescoping over the end of said barrel, reversible chucks, having flattened or shouldered portions, designed to telescope within said barrel, and a square outlined aperture within the barrel portion, against the marginal edges of which aperture the flattened or shouldered portions of said chuck are adapted to be seated, whereby the barrel portion and the chuck are prevented from turning independent of each other.

4. A screw-driver kit consisting of the barrel portion having slitted ends, a shoulder on the circumference of said barrel portion having a series of teeth thereon, chucks telescoping within said barrel, and a casing-section telescoping over the contracted end of said barrel portion, a series of teeth on the end of said section which are adapted to intermesh with the teeth on said shoulder, whereby the barrel portion and casing-section are prevented from turning independent of each other, as set forth.

In testimony whereof I hereunto affix my signature in presence of two witnesses.

WILLIAM J. SMITH.

Witnesses:
PHIL W. WEBER,
S. D. NEVIN.